United States Patent [19]

Kim et al.

[11] Patent Number: 5,080,808
[45] Date of Patent: Jan. 14, 1992

[54] METHOD OF WASHING AN UPFLOW FILTER AND FILTER BED EMPLOYED IN SAID FILTER

[75] Inventors: Annabelle Kim, Rosemont; R. Lee Roberts, Boothwyn, both of Pa.

[73] Assignee: Roberts Filter Manufacturing Company, Darby, Pa.

[21] Appl. No.: 576,023

[22] Filed: Aug. 31, 1990

Related U.S. Application Data

[63] Continuation-in-part of Ser. No. 561,030, Aug. 1, 1990.

[51] Int. Cl.$^5$ ...................... B01D 37/03; B01D 24/46
[52] U.S. Cl. .................................... 210/792; 210/738; 210/794; 210/274; 210/279; 210/269; 210/807
[58] Field of Search ............... 210/738, 791, 792, 793, 210/794, 274, 220, 221.1, 221.2, 279, 269, 807

[56] References Cited

U.S. PATENT DOCUMENTS

| | | | |
|---|---|---|---|
| 4,479,880 | 10/1984 | Treanor | 210/274 |
| 4,604,197 | 8/1986 | Louboutin et al. | 210/274 |
| 4,608,181 | 8/1986 | Hsiung | 210/274 |
| 4,668,405 | 5/1987 | Boze | 210/274 |
| 4,707,257 | 11/1987 | Davis et al. | 210/274 |

Primary Examiner—Stanley S. Silverman
Assistant Examiner—Neil M. McCarthy
Attorney, Agent, or Firm—Caesar, Rivise, Bernstein, Cohen & Pokotilow, Ltd.

[57] ABSTRACT

A method of washing an upflow filter between service runs employs a filter bed having a non-buoyant particulate filter layer through which influent to be filtered is directed in an upward direction, and through which liquid employed in the washing operation is directed in an upflow direction. A two-stage washing operation includes the steps of first directing a combination of air and liquid in an upflow direction through the filter layer with the velocity of the liquid being less than the minimum fluidization velocity of the filter layer, for disrupting only some floc retained in the filter layer during a previous service run, and thereafter directing only liquid in an upflow direction through the filter layer at a velocity less than the minimum fluidization velocity of the filter layer for removing disrupted floc from the filter layer while leaving some floc attached to said particulate media of the filter layer. The process most preferably is carried out with a filter bed including a coarse, particulate media flocculation layer for distributing the flow of influent and promoting flocculation.

18 Claims, 2 Drawing Sheets

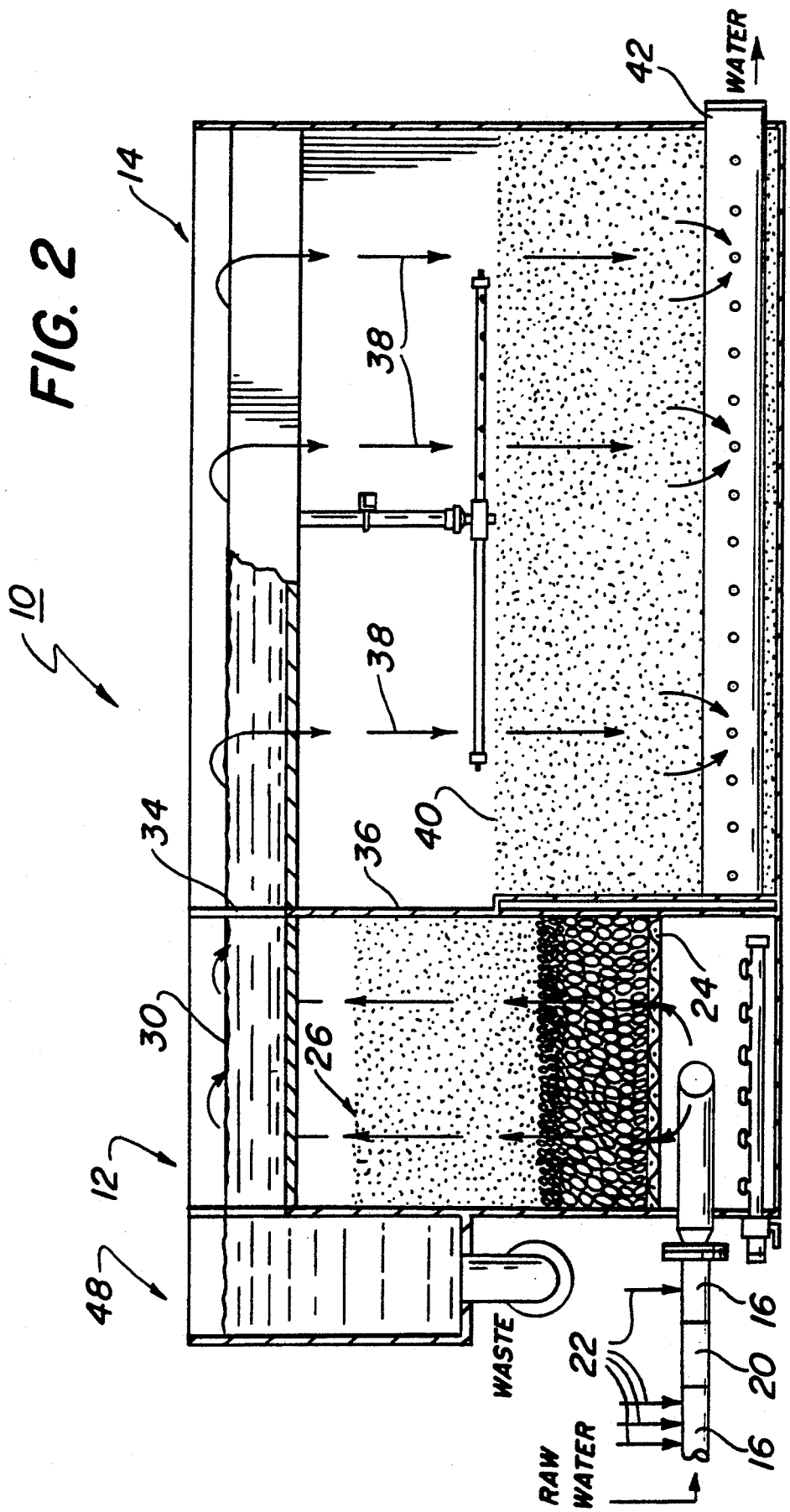

METHOD OF WASHING AN UPFLOW FILTER AND FILTER BED EMPLOYED IN SAID FILTER

RELATED APPLICATION

This application is a continuation-in-part of U.S. application Ser. No. 07/561,030, filed on Aug. 1, 1990, entitled Method of Washing an Upflow Filter and Filter Bed Employed in Said Filter.

FIELD OF THE INVENTION

This invention relates to a method of washing an upflow filter or contact clarifier between service runs, and to a filter bed employed in the upflow filter.

BACKGROUND ART

Many different methods have been employed to backwash conventional downflow filters. In most of these methods the backwashing operation is carried out employing clean, filtered wash water in a direction counter to the direction of influent flow during the filtering or service runs.

Probably the most commonly accepted practice for backwashing a granular filter bed in a gravity filter is to supply a fluidizing flow of clean, filtered water in an upflow direction to expand the bed and carry away floc and particulate matter which has been collected in the bed during a previous service run. This washing method is often accompanied by a surface wash with rotary or fixed jets of water. In these prior art techniques it has been recognized that the velocity o the backwashing liquid should be sufficient to expand or fluidize the bed to provide adequate cleaning between service runs.

The prior art also suggests the use of air scouring to augment the cleaning of a filter bed. One such method employs simultaneous air and water flow at rates which are sufficiently high to fluidize the bed. These techniques often result in excessive media loss, resulting from the carrying away of media along with the floc during the backwashing operation.

One prior art technique of utilizing air scouring while minimizing media loss employs a two-stage process. In the first stage air scour alone is applied with no upflow of water in order to agitate and loosen the floc collected in the bed. During the second stage an upflow of water is provided at a sufficiently high rate to fluidize the entire bed, and thereby carry away the loosened floc and debris.

Another prior art technique, which is probably the least commercially applied in the United States, employs the combination of an air scour and a non-fluidizing upflow of water as the sole means to carry out the backwashing operation. Under optimum flow conditions there is an observable formation and collapse of air pockets, and the concomitant local movement of media, yielding maximum particle-to-particle collision and floc disruption with minimum media loss. This condition occurs when the velocity of the air and of the upflow water approximately fulfills the following relation developed by Amirtharajah, et.al.:

$$0.45 (Q_a)^2 + \% \frac{V}{V_{mf}} = 41.9$$

wherein "V" is the velocity of backwash liquid; $V_{mf}$ is the minimum fluidization velocity and $Q_a$ is the air scour rate in standard cubic feet per minute/sq.ft.

This system of employing an air scour and a non-fluidizing flow of water has been used primarily in European conventional downflow filter systems, in which the direction of water flow is reversed for cleaning, and the washing liquid is filtered or clean water. This latter system is operated for a sufficient length of time to completely clean the filter bed, as is evidenced by the clarity of the wash water and the return of the bed to substantially the clean filter bed headloss. Moreover, this approach has been practiced in European conventional downflow filters wherein the filter media is fine (i.e., having an effective size equal to a fraction of a millimeter). In the U.S., this approach has been primarily limited to wastewater applications with coarse media having an effective size greater than one millimeter wherein the incoming influent has a very high solids content and turbidities substantially in excess of 100 nephelometric turbidity units, (NTU). Moreover, in wastewater filtration, the washing liquid is filtered water.

Yet another known method for washing an upflow clarifier or roughing filter is employed in the Microfloc Trident system, as is disclosed in U.S. Pat. No. 4,547,286. This latter system employs a clarifier section that relies upon the use of a filter bed of buoyant (specific gravity less than 1), synthetic media, followed by a conventional downflow filter employing a non-buoyant media bed. The buoyant filter bed is cleaned between service runs by injecting air into the influent to cause the buoyant bed to fluidize and expand downwardly to release floc particles from the bed. Thereafter the injecting of air into the influent can be discontinued, and the continuous upward flow of influent continued to flush out the loosened floc from the bed. Although the '286 patent discloses only partially cleaning the filter bed between service runs, it discloses complete cleaning every fifth cleaning and it accomplishes this result in a bed of relatively expensive, and somewhat difficult to handle synthetic buoyant particles.

OBJECTS OF THE INVENTION

It is an object of this invention to provide an extremely economical and effective method of washing a non-buoyant particulate filter bed in an upflow filter system.

It is another object of this invention to provide a method of washing a non-buoyant particulate filter bed in a manner which minimizes the elapsed run time needed for effective filtering following each wash cycle.

It is another object of this invention to provide a method of washing a particulate, non-buoyant filter bed in a shorter period of time than has heretofore been possible.

It is a further object of this invention to provide a method of washing a non-buoyant particulate filter bed in a manner which enhances the formation and retention of floc within the bed during service runs.

It is a further object of this invention to provide a method for washing a non-buoyant particulate filter bed without excessive loss of the particles making up the filter bed.

It is a further object of this invention to provide a method of washing a non-buoyant particulate filter bed wherein floc to be removed during the washing operation is first separated from its retention by the particles of the bed.

It is a further object of this invention to provide a method of washing a non-buoyant particulate filter bed which does not involve the use of expensive or complex controls for directing washing liquid through the filter bed in a direction opposite to the direction of the flow of the influent during service runs.

It is a further object of this invention to eliminate the expense and complexity of controls for shutting off, increasing or decreasing the rate of flow of washing liquid between service runs.

It is a further object of this invention to provide a method for washing a non-buoyant particulate filter bed wherein the influent filtered by the bed is also employed as the washing liquid.

It is a further object of this invention to provide a non-buoyant particulate filter bed which promotes the formation of floc therein and employs naturally formed particulate material.

It is a further object of this invention to provide a non-buoyant particulate filter bed which effectively promotes both the formation and retention of floc therein.

It is further object of this invention to provide a filter particle size and specific gravity such that less than 20% of the bed is fluidized in upflow filtration over a broad operational range of temperature and fluid viscosity at flow rates of 5 to 20 gpm/sq. ft.

SUMMARY OF THE INVENTION

The above and other objects of this invention are achieved in a method of washing an upflow filter between service runs, wherein the upflow filter includes a filter bed having a non-buoyant particulate clarifier or filter layer through which influent to be filtered is directed in an upflow direction, for causing floc in said influent to be retained in the layer. The method includes the steps of first directing a combination of air and liquid in an upflow direction through the filter layer, with the velocity of the liquid being less than the minimum fluidization velocity of the filter layer, to thereby disrupt only some floc retained in said layer during a previous service run. Thereafter the flow of air is terminated and only liquid is directed in an upflow direction through the filter layer; again at a velocity less than the minimum fluidization velocity of the filter layer, to thereby remove disrupted floc from the filter while leaving in said filter layer floc attached to said particulate media.

In the most preferred embodiment of this invention the influent directed in an upflow direction during service runs is the same liquid employed in both stages of the washing operation. This has the advantage of eliminating the need to employ a clear well from which the washing liquid would otherwise need to be drawn.

In accordance with the most preferred method of this invention the flow rate of the liquid during both stages of the washing operation is substantially the same as the flow rate of the liquid during a service run. This eliminates the added complexity and expense of changing the velocity between the service runs and the washing runs.

In accordance with the most preferred method the washing operation is terminated while the influent is still turbid and with some floc still retained in the filter layer. This has been found to effectively promote the growth and removal of floc from influent during subsequent service runs, thereby effectively removing solids from the influent with short wash cycles.

In accordance with the preferred embodiment of this invention the velocity of the liquid in both stages of the washing operation is substantially less than the minimum fluidization velocity of the filter layer. In fact, in the preferred embodiment of the invention the minimum fluidization velocity of the filter layer is on the order of 40 gallons per minute/sq.ft. and the velocity of the influent during the washing run ranges from 5 to 20 gallons per minute/sq.ft., and most preferably on the order of 10-15 gallons per minute/sq.ft.

In the most preferred embodiment of this invention the combination of air and liquid is directed through the filter layer during the first stage of the washing operation, for a period of less than five minutes, and thereafter, only liquid is directed through the filter layer for a period of time less than five minutes.

In accordance with the most preferred embodiment of this invention a flocculation layer of particulate, non-buoyant material is disposed below, or upstream of the filter layer in the direction of liquid flow, and is coarser than said filter layer. The flocculation layer has a porosity and particle size for providing a velocity gradient that optimizes the mixing of the influent to promote flocculation, without, at the same time, retaining substantial portions of floc formed in said layer.

In the most preferred embodiment of this invention a transitional support layer which is coarser than the filter layer but finer than the flocculation layer is disposed between the flocculation layer and the filter layer. This transitional support layer aids in supporting the clarifier/filter layer and also will retain some floc therein. However, the main floc retaining function is provided by the clarifier/filter layer.

In accordance with the most preferred embodiment of this invention the filter layer has an effective particle size which is greater than 1 mm and most preferably is employed in connection with the filtering of influent having a low solids content and turbidities less than 100 NTU.

A filter bed in accordance with this invention includes an upstream, static flocculation layer of particulate, non-buoyant material having a porosity and particle size for providing a velocity gradient in the range of approximately 40-60 reciprocal seconds at liquid flow rates in the range of 10-15 gallons per minute/sq.ft., to thereby promote the mixing and flocculation of the coagulated liquid influent. By promoting flocculation in the flocculation layer turbidity removal in the downstream filter layer is enhanced, with lengthened service run times being achieved without creating an excessive headloss. Moreover, since floc collection in this layer is minimal due principally to the short residence time between the chemical dosing point and this static flocculation layer, the high porosity of the flocculation layer and the relatively low solids content of the influent typically treated in accordance with this invention, an essentially constant velocity gradient flocculation environment is provided over substantially the entire period of each service run.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 2 is a schematic, sectional view of a filter system embodying the present invention, and showing its arrangement and operation during a service run.

DESCRIPTION OF THE PREFERRED EMBODIMENT OF THE INVENTION

Figure 1:
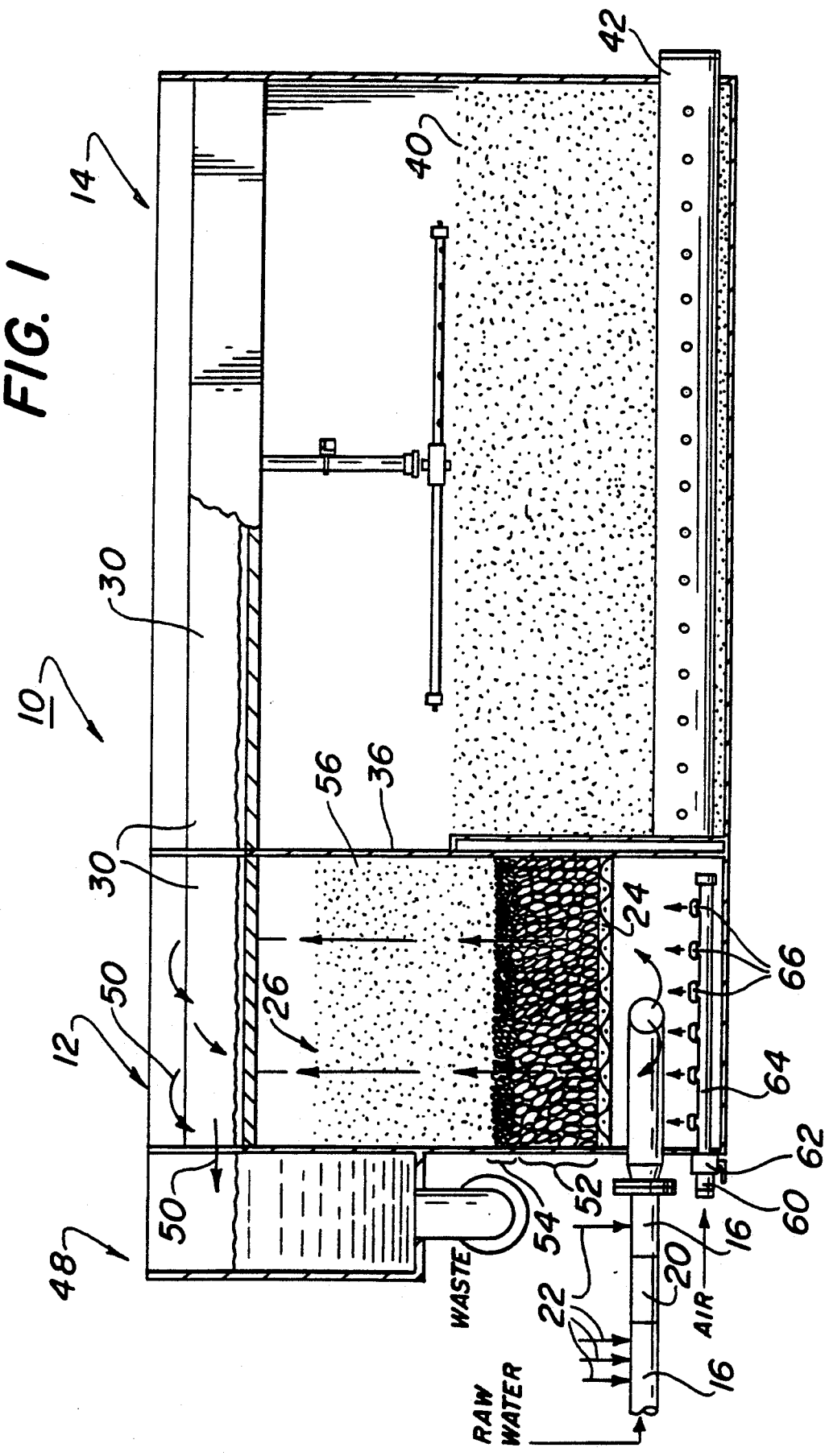
FIG. 1 is a schematic, sectional view of a filter system embodying the present invention, and showing its arrangement and operation during a washing cycle.

Referring now in greater detail to the various figures of the drawings, wherein like reference characters refer to like parts, a filter system embodying the present invention is generally shown at 10 in FIG. 1.

The filter system 10 in the preferred embodiment of the invention includes an upflow prefilter or contact clarifier 12 followed by a gravity flow, polishing filter 14.

As can be seen in FIGS. 1 and 2 the prefilter 12 includes an inlet conduit 16 adjacent the lower surface thereof, into which influent to be filtered is directed. In the preferred operation of this device the influent has a low solids content with turbidities on the order of less than 100 NTU.

Chemicals such as primary coagulants, coagulant aids, disinfectants, etc., are injected through a series of conduits (schematically represented by arrows 22) which communicate with the water inlet conduit 16 upstream and/or downstream of a conventional static mixer 20. However, it should be understood that the arrangement for injecting chemicals into the influent does not constitute any limitation on the present invention.

The inlet conduit 16 extends into the prefilter 12 in a region below a media-supporting screen 24. The screen 24 supports a multi-media, non-buoyant filter bed 26. Alternatively, conventional underdrains or support structures could be employed. The filter bed 26 constitutes an important aspect of the present invention.

Although a media-confining screen also has been employed adjacent the upper surface of the filter bed 26 (not shown), due to the non-buoyancy of the filter bed and the manner in which the prefilter 12 is operated in both its filtering (i.e., service) and washing modes, the use of such a confining screen probably is not required.

Located above the filter bed 26 is a liquid receiving trough 30 which communicates with the gravity flow, polishing filter 14 during service runs of the filter (FIG. 2), and with a waste-receiving vessel 48 during the washing cycle (FIG. 1).

Referring specifically to FIG. 2, during service runs of the filter 10 influent to be filtered is mixed with coagulating chemicals and directed through the inlet conduit 16 into a region below the multi-media, non-buoyant filter bed 26. The influent then flows upwardly through the filter bed, preferably at a flow rate of between approximately 10–15 gallons per minute/sq.ft. (gpm/sq.ft.), to remove undesired solids from the influent in a manner which will be described in detail hereinafter.

After passing through the filter bed 26 the prefiltered influent flows into the receiving trough 30, and through a passage 34 in a partition 36 between the prefilter 12 and the polishing filter 14. It should be noted that during the service run the waste valve (not shown) is closed, and the receiving trough 30 establishes communication between the prefilter 12 and the polishing filter 14 through the passage 34. The influent then overflows the trough in the polishing filter 14, in the direction of arrows 38, passes through a conventional multimedia, non-buoyant filter bed 40, and then exits the polishing filter 14 through an outlet duct 42.

It should be understood that the dual filter system 10 is illustrated herein because it is the preferred overall arrangement in which the present invention is employed. However, the present invention relates to the construction and mode of operation of the upflow prefilter 12, and in particular, to the construction of the non-buoyant bed and to the method of washing the bed between service runs. This prefilter section 12 can be used alone or in other filter applications, in accordance with the broadest aspects of the invention.

Referring to FIG. 1, the filter system 10 is shown in a washing cycle, in accordance with this invention. In this washing cycle the waste valves (not shown) are in the open position to provide communication between the trough 30 in the prefilter 12 and the waste collection section 48 into which wash liquid from the prefilter 12 is directed, as is shown by arrows 50.

Referring specifically to FIG. 1, the multi-media, non-buoyant filter bed 26, employed in accordance with the most preferred embodiment of the invention includes a lower static flocculation layer 52, a transitional support layer 54 and a clarifier or filter layer 56.

The lower flocculation layer 52 is the coarsest layer of the bed and is constructed to enhance distribution and flocculation of the coagulated influent. Most preferably the flocculation layer 52 is made up of coarse gravel having an effective size (ES) greater than 2 millimeters, and preferably greater than 4 millimeters.

In the most preferred embodiment of this invention the lower flocculation layer 52 is 6–24 inches deep, and is formed of coarse gravel having a specific gravity greater than 2, and preferably greater than 2.4, an effective size (ES) no greater than 6.5 millimeters, a uniformity coefficient (UC) greater than 1.2 and a porosity of 40%–45%. Most preferably the effective size of the gravel in the flocculation layer 52 is in the range 5–6.5 millimeters.

The effective size of the particles and the porosity of the flocculation layer 52 are selected to provide a velocity gradient of between approximately 40–60 reciprocal seconds (1/sec) at influent flow rates in the range of 10 gpm/sq.ft. and 15 gpm/sq.ft., for aiding in distributing and flocculating the influent directed through the flocculation layer, without collecting substantial floc therein. In fact, in the most preferred embodiment of this invention the gravel flocculation layer 52 is selected so that virtually no floc is collected therein, thereby creating a substantially constant headloss through this layer during each service run of the prefilter 12.

The lower flocculation layer 52 functions entirely differently from the clarifier or filter layer 56, in that it is designed to provide the velocity gradient needed to mix and flocculate the coagulated raw water, without retaining the formed floc therein. In distinction, the clarifier layer 56 functions to retain the floc formed in the layer 52, as will be discussed in detail hereinafter.

It has been determined that the optimal velocity gradient for promoting flocculation is approximately 50 reciprocal seconds, and that this velocity gradient is directly related to headloss. The headloss is determined by the permeability of the media, and the permeability of the media is related to the media size and porosity.

The permeability of the porous flocculation layer 52 may be estimated from the Carman-Kozeny relation as follows, where K is the permeability, e is the porosity of the media, c is the Kozeny constant, and V/S is the volume to surface ratio of the grains:

$$K = \frac{e^3}{c(1-e)^2}\left[\frac{V}{S}\right]^2$$

From the permeability, Darcy's Law for porous media is employed to determine the pressure drop per unit length (Pl) of the flocculation layer 52, where Q/A is the superficial velocity of the fluid and $\mu$ is its viscosity. Darcy's Law is as follows:

$$Pl = \frac{Q}{A}\cdot\frac{\mu}{K}$$

Based upon the calculation of Pl, the velocity gradient (G) in reciprocal seconds (1/sec) can be estimated in accordance with the following equation:

$$G = \left[\frac{Pl\,Q}{\mu\,A\,e}\right]^{\frac{1}{2}}$$

Combining the above equations and modelling the media particles as spherical, we obtain a relation for velocity gradient based upon the size and porosity of the media, and the flow rate. This expression is:

$$G = \frac{3\,Q\,\sqrt{c}\,(1-e)}{A\cdot a\cdot e^2}$$

At the preferred design flowrate of 10-15 gpm/sq.ft., the coarse static flocculation layer 52 collects little floc and provides the design velocity gradient. The typical design parameters for the static flocculation media are:
a:=0.35 cm Radius of average media particle; approximate as $\frac{1}{2}$ of 60% size
e:=0.43 Porosity of coarse static flocculation
c:=5 Kozeny constant
A:=1 Unit area
Q10:=0.6791 Flowrate per unit area in cu.cm/sec(10 gpm/sq.ft.)
Q15:=1.019 Flowrate per unit area in cu.cm/sec(15 gpm/sq.ft.)
Using the relation derived above, $$G(Q, e, c, a, A) := \frac{3\cdot Q\cdot\sqrt{c}\cdot(1-e)}{A\cdot a\cdot e^2}$$

and solving for the range of flowrates, we obtain the velocity gradient in units of reciprocal seconds:

| | |
|---|---|
| G(Q10,e,c,a,A) = 40.125 | Velocity gradient at 10 gpm/sq.ft. |
| G(Q15,e,c,a,A) = 60.207 | Velocity gradient at 15 gpm/sq.ft. |

Thus, in the preferred embodiment of this invention "G" is calculated to be substantially 40 reciprocal seconds at a flow rate of 10 gallons per minute per sq.ft. and substantially 60 reciprocal seconds at a flow rate of 15 gallons per minute per sq.ft.

In summary, the size and porosity of the particles in the lower flocculation layer 52 have been selected such that the resulting velocity gradient over the preferred range of operational flow rates (i.e., 10-15 gallons per minute per sq.ft.) is within a desired operating range of approximately 40-60 reciprocal seconds. In particular, and as explained above, at a 60% particle size of about 7 millimeters (diameter), with a porosity of about 43%, the velocity gradient has been calculated to be between approximately 40-60 reciprocal seconds at flow rates of from about 10-15 gallons per minute per sq.ft. This arrangement of the flocculation layer 52 provides for increased turbidity removal by the clarifier or filter layer 56, with longer service runs and without incurring significant excess headloss.

Specifically, in tests conducted on a raw water of 3-5 NTU in Vancouver, Wash., a 4-foot deep clarifier bed with the static flocculator layer produced an effluent of about 0.6 NTU (85% turbidity removal), while an equal depth of clarifier media without the static flocculator layer produced an effluent of about 1.6 NTU (60% turbidity removal). In both cases the difference between clean bed and ending headloss was about 18 inches. (A bed composed of only static flocculator media effects virtually no turbidity removal but its effluent comprises pinfloc consistent with its function of forming but not retaining floc).

In the preferred embodiment of this invention the transitional support layer is formed of coarse gravel having a specific gravity greater than 2.4, an effective size (ES) in the range of about 2.5-3.5 and a uniformity coefficient (UC) greater than 1.2. This layer 54 serves to support the clarifier or filter layer 56 above the flocculation layer 52, and does tend to collect some floc in it. However, it should be understood that the primary floc retention function in the filter bed is provided by the clarifier or filter layer 56.

The clarifier or filter layer 56 is designed to retain a large percentage of the floc which is formed in the lower flocculation layer 52, and which moves into said filter layer from said flocculation layer. Moreover, further floc formation and growth occurs in the filter layer 56, through the mixing and contact of solids with particles of floc previously formed in the flocculation layer 52. In tests performed on various raw water sources the turbidity removal by the contact clarifier varied from 50 to over 90%.

The filter layer 56 preferably has a depth greater than the static flocculator layer 52 and is formed of non-buoyant media (e.g., sand or gravel) having a specific gravity greater than 2, and most preferably greater than 2.5. In the preferred form of this invention the filter layer is formed of gravel and/or sand having an effective size (ES) greater than 1 mm, and most preferably in the range of 1.7 to 2.0 mm; a uniformity coefficient (UC) of 1.2-1.8 and a porosity of 36%-40%.

It should be understood that a floc collects within the clarifier or filter layer 56, the head loss and velocity gradient of that layer increases.

In accordance with a further aspect of this invention a unique, 2-stage process for washing the filter bed is employed. This unique washing process maximizes cleaning efficiency as well as filtering efficiency, by minimizing the elapsed run time needed for effective filtering following each wash cycle.

As stated earlier, the prefilter 12 preferably is operated during each service run at an influent flow rate in the range of 10-15 gallons per minute per sq.ft. Also, as stated earlier, the flocculation layer 52 serves to distribute the incoming flow of influent and provides the velocity gradient needed for optimizing mixing and flocculation. This layer 52 differs from the clarifier or filter layer 56, in that virtually no floc is retained within it, and minimal headloss buildup is contributed by it. In distinction to the flocculation layer 52, the clarifier or filter layer 56 clarifies the water by retaining the incoming floc and actually forming larger floc by contact with previously formed floc particles. This also results in an increase in headloss through the layer 56.

During the first wash stage of the wash cycle a combination of an upward flow of air and an upward flow of water is directed through the filter bed 26. As can be seen best in FIG. 1, the air is directed into the prefilter 12 through an inlet conduit 60, and is distributed through a plenum 62 into a series of headers 64 (only one being shown in FIG. 1), each having a series of distribution nozzles 66 along the length thereof for uniformly distributing the air along the entire area of the prefilter 12, under the filter bed 26. Alternative conventional air-water distribution systems are also acceptable.

In the most preferred embodiment of the invention the washing water actually is the influent directed through inlet conduit 16; including the coagulating chemicals added thereto. Moreover, the upward flow rate of said liquid is substantially the same as the flow rate of the influent during the filtering run, i.e., in the range of 5-20 gallons per minute per sq.ft. This eliminates the inefficiency in operation and complexity of equipment resulting from the need to stop and restart the influent water pump and/or increase or decrease the flow rate.

As will be explained in greater detail hereinafter, the flow rates of the air and influent during the first wash stage are selected to optimize floc disruption within the filter layer 56, while minimizing the loss of filter media.

The air rate (Qa) during the first wash stage of the wash cycle is determined by optimizing the air-water scrub, as given by the following equation:

$$0.45 \, (Qa)^2 + \left( \% \frac{V}{V_{mf}} \right) = 41.9$$

wherein "V" is the velocity of liquid (i.e., the influent) in gallons per minute/sq.ft. during washing and "$V_{mf}$" is the minimum fluidization velocity in gallons per minute/sq.ft.

The minimum fluidization velocity, $V_{mf}$, is determined by the following equation:

$$V_{mf} = 0.00381 \, (d_{60\%})^{1.82} \, (sg-1)^{0.94} \, p^{1.88} \, \mu^{-0.88}$$

wherein "$d_{60\%}$" is the 60% size of the media particles in millimeters (equal to the product of the uniformity coefficient of the particles (UC) and the effective size of the particles (ES)); "sg" is the specific gravity of the particles; "p" is the density of the liquid in lbs./cu.ft., and "$\mu$" is the viscosity of the liquid in centipoise. If the Reynolds number based on $d_{60\%}$ and $V_{mf}$ is greater than 10, the following multiplying correction factor must be applied, $$K_{mf} = 1.775 \, Re_{mf}^{-0.272}$$

where $Re_{mf}$ is the Reynolds number based on $d_{60\%}$ and $V_{mf}$.

These relations may be combined to yield the air-water scrub rates as follows:

$$Qa = [93.11 - 5.83 \times 10^4 V \, d_{60\%}^{-1.82} \, (sg-1)^{-0.94} \, p^{-1.88} \mu^{+0.88}]^{\frac{1}{2}}$$

If the Reynolds number based on $d_{60\%}$ and $V_{mf}$ is greater than 10, the relation for air scrub rate becomes:

$$Qa = [93.11 - 2116 \, V \, d_{60\%}^{-1.053} \, (sg-1)^{-0.684} \, p^{-1.097} \mu^{0.369}]^{\frac{1}{2}}$$

Based upon both the preceding theory and experimental results, the optimum air rate has been determined over the range of operational water flow rates and a broad range of liquid temperatures (1–27° C.) The results are as follows:

| Water rate (gpm/sq.ft.) | Air rate (scfm/sq.ft.) |
|---|---|
| 5–10 | 9–6 |
| 10–15 | 8–3 |
| 15–20 | 7–1 |

From the above table it can be seen that, in accordance with the broadest aspect of this invention the air flow is in the range of approximately 1–9 standard cubic feet per minute/sq.ft. at liquid flow rates in the range of approximately 5–20 gallons per minute/sq.ft.

In the most preferred embodiment of this invention the air flow rate is maintained in the range of approximately 3–8 Scfm/sq.ft., with the liquid wash rate in the range of 10–15 gallons per minute per square foot. Most preferably the air flow rate is maintained in the range of 6–8 Scfm/sq.ft. at a liquid flow rate of 10 gpm/sq.ft., and in the range of 3–7 Scfm/sq.ft. at a liquid flow rate of 15 gpm/sq.ft.

Applicant has found that the first washing stage of the wash cycle can be carried out for the unusually short period of time of less than five minutes, and preferably in the range of 2–4 minutes. This abbreviated wash cycle results in some of the floc remaining attached to the particulate media of the filter layer 56. This floc retention is evidenced by the difference between the initial headloss of the unused bed (approximately 1.5 feet headloss for a 4-foot bed depth) and the post-wash cycle headloss (approximately 2 feet headloss for a 4-foot bed depth).

In accordance with this invention the length of the first washing stage is carried out such that, at the end of that stage, the wash water is still turbid with floc and the headloss through the filter layer 56 is at least 15% greater than the headloss through said layer when said layer is free of floc.

The second washing stage of the two-stage cleaning cycle is carried out with an upflow of wash liquid, without any air scrub. Most preferably the liquid employed in this second stage is the same influent which is to be filtered and which also is employed during the first stage of the cleaning cycle. The coagulating chemicals also are added to the influent during this washing stage.

Also, most preferably the second washing stage is carried out at the same liquid flow rate as is employed in the first stage of the cleaning cycle (and also as is employed during the service cycle). This second stage "water only rinse" is employed to carry away the disrupted and torn floc and solids from the first air scrub washing stage, such that only attached floc remains within the clarifier layer 56 at the end of the second stage. In particular, the non-fluidizing flow rate of the liquid during the second stage is not sufficient to loosen floc that has not previously been disrupted during the first washing stage of the cleaning cycle. The water only stage also aids in flushing out entrained air within the bed.

As a result of the two-stage wash cycle in accordance with this invention the floc remaining within the clarifier layer 56 after each cycle enhances contact clarification and enables a more rapid return to maximum filtering capability and turbidity removal during each service run. This beneficial result is achieved in a filter bed formed of relatively inexpensive, naturally occurring non-buoyant particulate material.

In tests performed, a completely clean clarifier layer 56 (i.e., a layer completely free of floc) requires approximately 30 minutes to over an hour of run time to attained its maximum operational turbidity removal rate. During this time period poorly clarified water is directed to the polishing filter 14, resulting in higher loading on this latter filter, and, at times, reduced effluent quality.

In contrast, the clarifier layer 56 washed in accordance with the two-stage cycle of this invention, which is designed to retain a controlled quantity of floc attached to the particles of said layer, typically requires only 5–10 minutes of run time to attain optimum turbidity removal rates.

Applicant also has found that the second washing stage (water only) can be carried out for less than 5 minutes, and preferably in the range of 3–4 minutes, to achieve the desired removal of the disrupted and torn floc and solids resulting from the first washing stage of the cleaning cycle.

The two-stage washing cycle of this invention provides a number of benefits. First, since the direction of fluid flow during washing is the same as during the service run, there is no need for using expensive and complex valving systems to achieve a reversal of direction of fluid flow. Moreover, in the most preferred embodiment of this invention the flow rate of liquid remains constant during the service run and the entire washing cycle, thereby eliminating the need for expensive control systems to adjust or modify flow rates.

In addition, in the most preferred embodiment of this invention the influent to be filtered actually is employed as the wash water, thereby eliminating the need for a separate clear well basin, and the necessity of providing control systems and conduits for conveying a washing liquid from such a clear well basin. In other words, in accordance with this invention the raw water flow rate simply is maintained at its constant operational value throughout the filter-wash-filter cycle, effecting a reduction in design and operational complexity of the prefilter 12.

A further advantage of the washing cycle of this invention is that the first stage, which includes air scour and non-fluidizing water flow, is carried out for a fraction of the time normally employed in conventional systems. In European systems the combination of an air scour and non-fluidizing water flow is maintained for a sufficient length of time to completely "clean" the bed, as is evidenced by the clarity of wash water, as well as the return of the bed to near clean bed headloss conditions. This latter prior art approach is applicable for conventional downflow filters where the effective size of the media is a fraction of a millimeter. In wastewater applications the effective size is greater than one millimeter and the influent has a very high solids content with turbidities in excess of 100 NTU, and the wash water is filtered water.

A further advantage of this invention is that the two-stage cleaning cycle includes a non-fluidizing water-only rinse cycle, which serves to flush out only that floc disrupted by the air scrub—non-fluidizing first washing stage, while leaving solids attached to the media to enhance filtration upon the restart of the service cycle. As stated earlier, the water-only rinse also serves to rinse out entrained air bubbles resulting from the air scrub cycle.

The use of a two-stage cleaning cycle in conjunction with a filter bed formed of non-buoyant particulate material and in which the liquid flow rates are maintained at non-fluidizing levels in both stages, contributes to the above-described advantages, and is an extremely important feature of the present invention.

Without further elaboration, the foregoing will so fully illustrate our invention that others may, by applying current or future knowledge, adopt the same for use under various conditions of service.

We claim:

1. A method of washing an upflow filter between service runs, said upflow filter including a filter layer through which influent to be filtered is directed in an upward direction during each service run for causing floc in said influent to be retained in said layer, said method of washing including the steps of:
   (a) directing a combination of air and liquid in an upflow direction through the filter layer with the velocity of the liquid being less than the minimum fluidization velocity of the filter layer and being in the range of approximately 5–20 gallons per minute/sq.ft. and with the rate of air flow being in the range of approximately 1–9 standard cubic feet per minute/sq.ft.;
   (b) discontinuing directing said combination of air and liquid in an upflow direction after a period of time for disrupting only some floc retained in said layer during a previous service run, while leaving some floc attached to said particulate media in said filter layer and with the headloss through the filter layer being at least fifteen percent greater than the headloss through said layer when said layer is free of flock; and thereafter
   (c) directing only liquid in an upflow direction through the filter layer with the velocity of the liquid being less than the minimum fluidization velocity of the filter layer and being in the range of approximately 5–20 gallons per minute/sq.ft. for removing disrupted floc from the filter while leaving in said layer floc attached to said particulate media of said filter layer.

2. The method of claim 1 wherein the liquid directed in an upflow direction in steps (a) and (c) is the influent liquid directed through the filter layer during service runs.

3. The method of claim 2 wherein the liquid directed through the filter layer in steps (a) and (c) of claim 1 is at substantially the same velocity as the velocity of the influent during the service runs.

4. The method of claim 1 wherein the rate of air flow in step (a) is approximately $Q_a$, wherein, when the Reynolds number based on $d_{60\%}$ and the minimum fluidization velocity is 10 or less:

$$Q_a = [93.11 - 5.83 \times 10^4 \, V \, d_{60\%}^{-1.82} \, (sg-1)^{-0.94} \, p^{-1.88} \, \mu^{0.88}]1;$$

and when the Reynolds number based on $d_{60\%}$ and $V_{mf}$ is greater than 10, the air scrub rate is approximately $$Qa = [93.11 - 2116 \, V \, d_{60\%}^{-1.053} \, (sg-1)^{-0.684} \, p^{-1.097} \, \mu^{0.369}]^{\frac{1}{2}}$$

with "V" being the velocity of the liquid in gallons per minute per square foot; "$d_{60\%}$" being the 60% size of the media particles in millimeters (equal to the product of the uniformity coefficient of the particles and the effective size of the particles); "sg" being the specific gravity of the particles, "p" being the density of the liquid in lbs/cu.ft. and "$\mu$" being the viscosity of the liquid in centipoise.

5. The method of claim 1 wherein the velocity of the liquid in steps (a) and (c) is less than one-half the minimum fluidization velocity of the filter layer.

6. The method of claim 1 wherein step (a) is carried out for a period of less than five (5) minutes.

7. The method of claim 6 wherein step (c) is carried out for a period of less than five (5) minutes.

8. The method of claim 1 including the step of forming said filter bed with a static flocculation layer of particulate, non-buoyant material that is coarser than said filter layer and is disposed upstream of said filter layer, in the direction of liquid flow through the filter bed, said particulate, non-buoyant material of said flocculation layer having particles of an effective size and uniformity coefficient for distributing the upward flow of influent during service runs and providing a velocity gradient for mixing said influent to promote flocculation without retaining substantial portions of floc in said layer.

9. The method of claim 8 wherein the depth of said flocculation layer is less than the depth of said filter layer.

10. The method of claim 1 wherein the particulate material of the filter layer has an effective size greater than one (1) millimeter to provide a coarse layer, said influent directed through the filter layer in an upflow direction having a low solids content with turbidity less 100 NTU.

11. The method of claim 8 wherein the particulate material of the filter layer has an effective size greater than one (1) millimeter to provide a coarse layer, said influent directed through the filter layer in an upflow direction having a low solids content with turbidity less than 100 NTU.

12. The method of claim 11 wherein the effective size of the particles in the flocculation layer is in excess of 2 millimeters.

13. The method of claim 8 including the step of providing a transitional layer of particulate material between the flocculation layer and the filter layer, said flocculation layer through which influent first passes being coarser than the transitional layer.

14. The method of claim 13 wherein the effective size of the particles in said flocculation layer is no greater than 6.5 millimeters, and the effective size of the particles in the transitional layer is approximately 2.5-3.5 millimeters.

15. The method of claim 1, including the step of forming the non-buoyant filter layer of particulate media having a specific gravity in excess of 2.

16. The method of claim 8 wherein the flocculation layer and the filter layer have specific gravities greater than 2.

17. The method of claim 8 including the step of providing a flocculation layer having particles with an effective size greater than 4 millimeters.

18. The method of claim 8 wherein the flocculation layer has a particle size and porosity for providing a velocity gradient of between approximately 40 and 60 reciprocal seconds at a flow rate of influent therethrough in the range of 10 to 15 gallons per minute/sq.ft.

* * * * *